June 15, 1943.  H. M. CONE, JR., ET AL  2,321,799
APPARATUS FOR INSTRUCTION IN RADIO DIRECTION FINDING
Filed Aug. 26, 1941  4 Sheets-Sheet 1
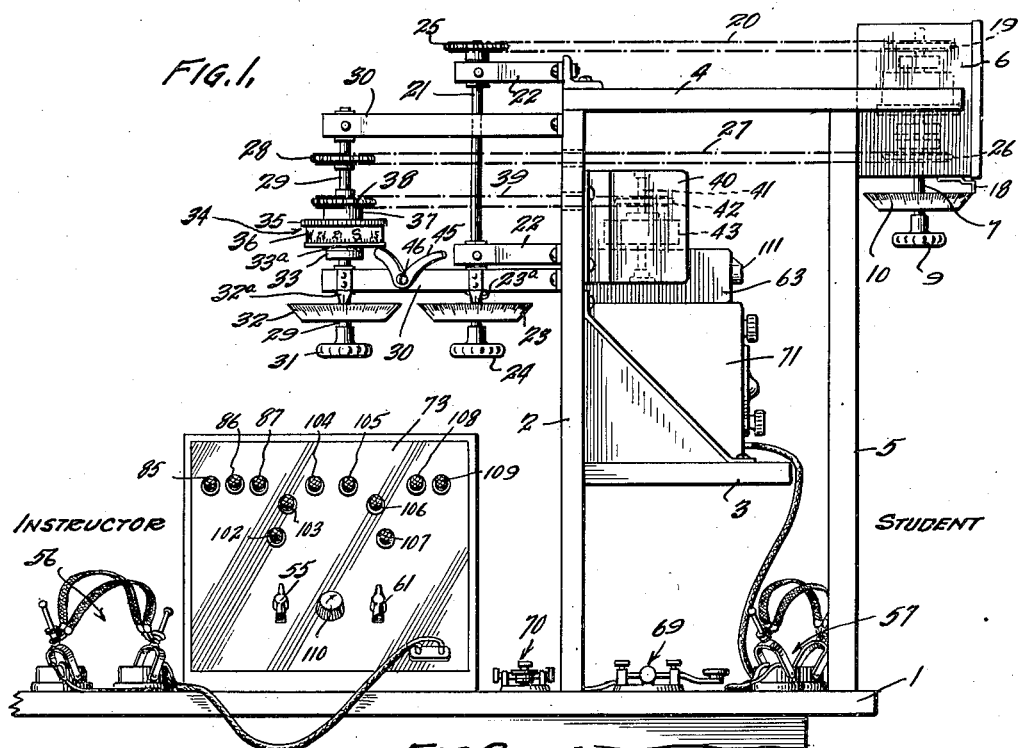
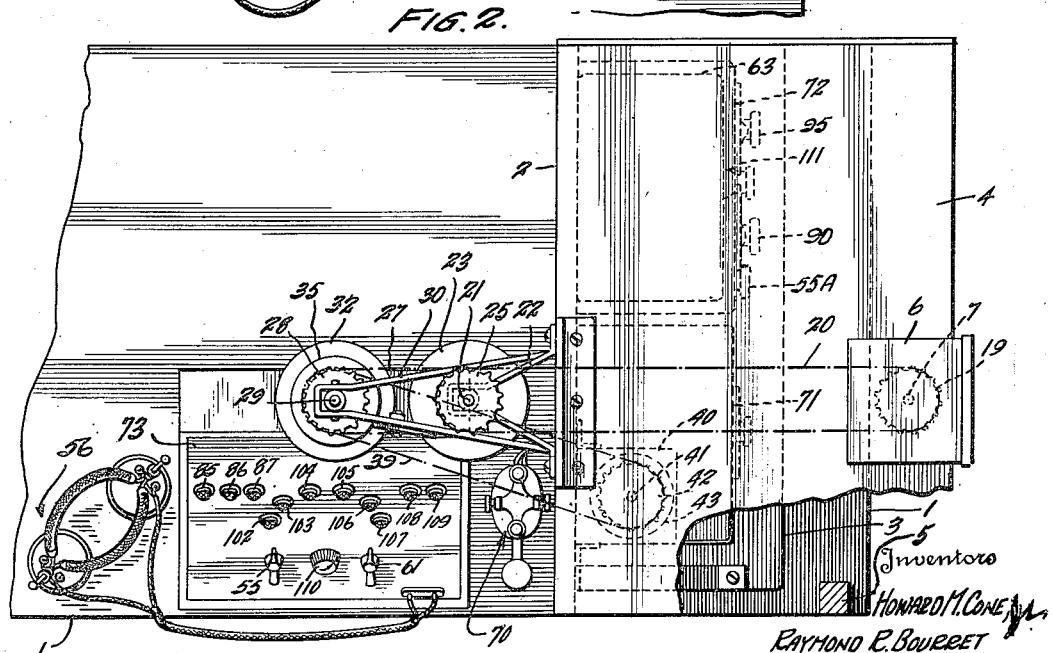

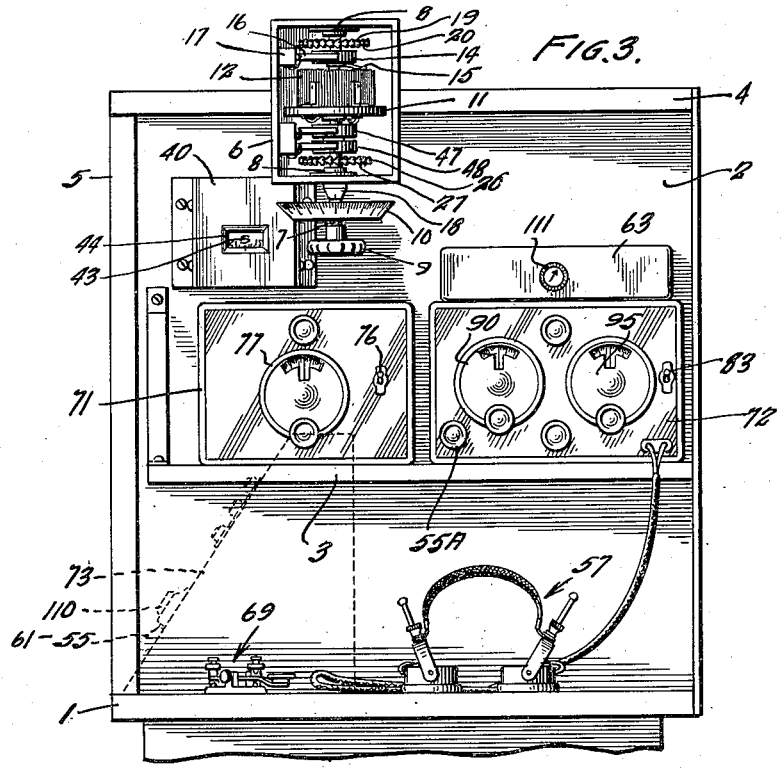

June 15, 1943.  H. M. CONE, JR., ET AL  2,321,799
APPARATUS FOR INSTRUCTION IN RADIO DIRECTION FINDING
Filed Aug. 26, 1941  4 Sheets-Sheet 3
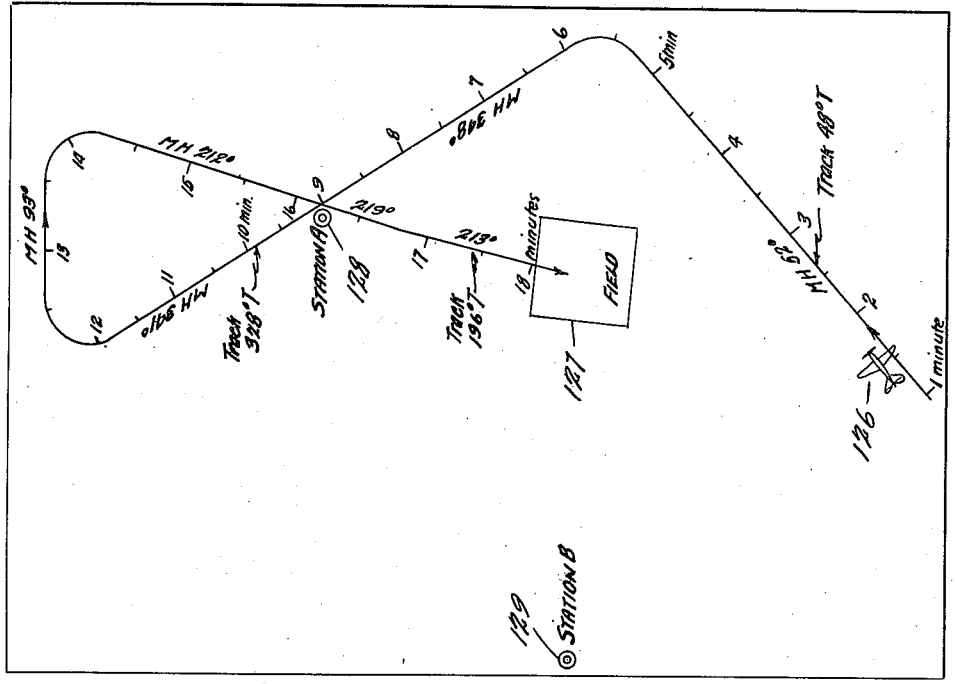
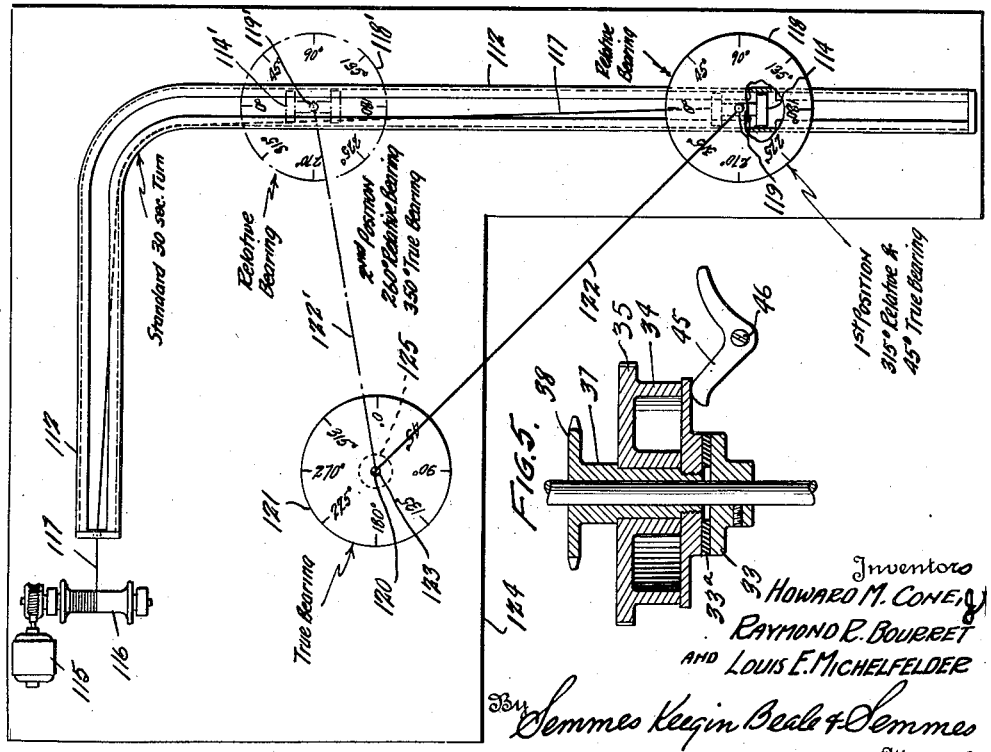

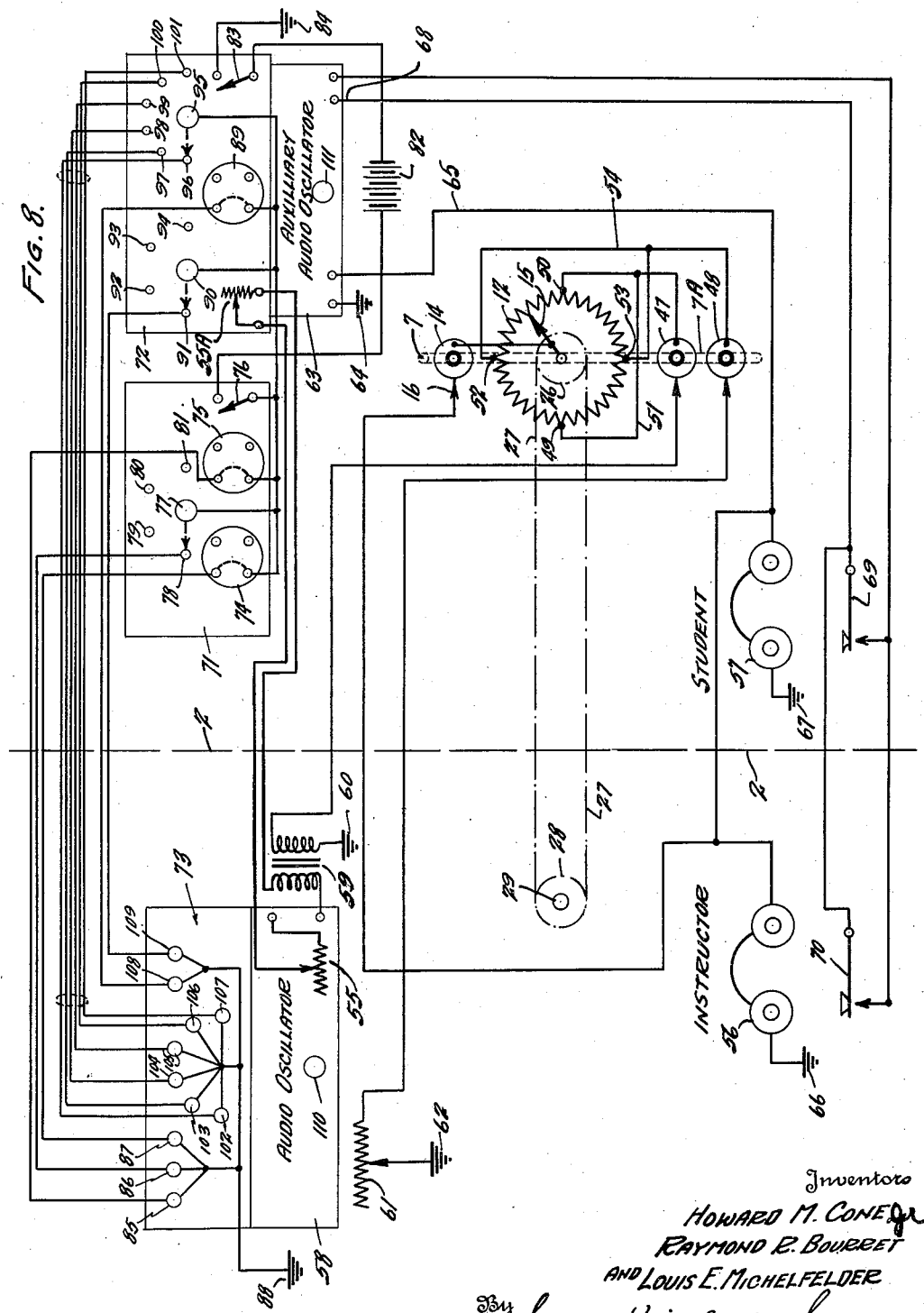

Patented June 15, 1943

2,321,799

UNITED STATES PATENT OFFICE

2,321,799

APPARATUS FOR INSTRUCTION IN RADIO DIRECTION FINDING

Howard M. Cone, Jr., Douglaston, N. Y., and Raymond R. Bourret, Coral Gables, and Louis E. Michelfelder, Miami, Fla.; said Bourret and said Michelfelder assignors to said Cone Application August 26, 1941, Serial No. 408,384

12 Claims. (Cl. 35—12)

Our invention relates broadly to a training and educational apparatus and more particularly to an apparatus for training pilots and radio operators in the operation of radio direction finder equipment.

One of the objects of our invention is to provide an apparatus for educating and training pilots and radio operators in the operation of radio direction finder equipment under conditions simulating actual flight conditions but in which various units of the instruction equipment are set up permanently in a ground school.

Another object of our invention is to provide an apparatus for duplicating on the ground various direction finder problems experienced during the flight of aircraft in which an instructor and student work in close cooperation for training the student in a relatively short time on the ground in the operating procedures of adjustment of radio direction finder apparatus, the taking of various bearings, simulating actual flight conditions and interpreting and understanding the bearings taken, thus greatly reducing the amount of actual flight time necessary to teach direction finder fundamentals.

Still another object of our invention is to provide an educational and training apparatus for teaching aircraft radio direction finder fundamentals for the training of personnel on the ground to thus provide training which cannot othewise be received because of limited flight facilities and available aircraft under existing conditions.

A further object of our invention is to provide an apparatus capable of cooperative functioning by instructor and student whereby all of the adjustments necessary to be made on radio direction finder apparatus may be selectively set up by the student and quickly checked by the instructor and mistakes readily explained to the student for correction and revision.

A still further object of our invention is to provide an instructor compartment and student compartment mounting arrangement for apparatus simulating aircraft radio direction finder equipment in which an instructor functioning in the instructor's compartment may set up various practical direction finder problems for the student in the student's compartment and then observe the manner in which the student proceeds with the direction finder adjustments in order that the student may be corrected and properly informed in minimum time as to the correct procedure to be followed.

Our invention contemplates the training of personnel in minimum time on the ground to enable reasonably skilled personnel to become expert in the operation of aircraft radio direction finder equipment and to enable such personnel to work out relatively intricate direction finder problems which would be encountered in actual flight conditions. It is believed that if all airline pilots, service pilots and aircraft radio operators were required to take approximately ten hours training on the ground according to the apparatus of our invention that such personnel could in times of stress, such as the failure of a radio range, or such as complete loss of position while in flight, turn to the radio direction finder with complete confidence in the obtaining of bearings for locating the position of the aircraft and the effecting of a positive and safe let-down procedure, thus insuring greater safety in the flight of aircraft. It is believed that if pilots in the past had resorted to bearings obtained by radio direction finders instead of relying solely on radio ranges there would have been fewer crashes. The apparatus of our invention saves substantial time and money in the training of personnel, provides training facilities not now available at a time when both the armed and civil services require skilled personnel and insure greater safety in the operation of aircraft.

Further objects of our invention reside in the construction and arrangement of electrical control circuits and mechanical systems operating in similitude as set forth more fully in the specification hereinafter following by reference to the accompanying drawings, in which:

Figure 1 is a side elevational view showing the instructor and student compartments and illustrating the training apparatus therein arranged in accordance with our invention; Fig. 2 is a plan view of the apparatus illustrated in Fig. 1, a portion of the top of the student's compartment being broken away to more clearly show the arrangement of the apparatus therein; Fig. 3 is a front elevational view of the student's compartment with the radio direction finder control unit illustrated in elevation; Fig. 4 is a perspective view of the student and instructor control mechanisms employed in our invention; Fig. 5 is a fragmentary elevation view of the clutch device employed in the instructor's control mechanism for permitting the setting up of various direction finder problems for solution by the student, certain of the parts being illustrated in section; Fig. 6 is a schematic view of a typical flight and landing path of an aircraft showing the principal bearings which are obtained by use of the radio direction finder for effecting landing of the aircraft, the view being illustrative of one problem which may be solved by the student and checked by the instructor employing the apparatus of our invention; Fig. 7 shows a typical apparatus employed by the instructor in setting up certain bearings typical of a radio direction finder problem to be solved by the student in using the apparatus of our invention; and Fig. 8 is a wiring diagram illustrating the interconnection of the apparatus in the instructor's compartment and the student's compartment for carrying out instruction in accordance with our invention.

The training apparatus of our invention is mounted upon a table structure indicated generally by reference character 1 which is divided into an instructor's compartment and a student's compartment by a transversely extending partition 2. The student's compartment is designed to simulate the radio operator's compartment abroad an aircraft and in this compartment the student has at his command all of the controls which would normally be available in the radio operator's compartment aboard the aircraft. The student's compartment includes a horizontally extending shelf 3 which serves as a support for the radio direction finder receiving apparatus. A top frame 4 extends over the student's compartment and is supported by a vertically extending frame member 5. The direction finding control unit is mounted in a casing 6 directly over the student's position and consists of a rotatable shaft 7 journalled by bearings 8 in the casing 6. A control knob 9 is secured to shaft 7 and immediately above control knob 9 there is a circular calibrated scale 10 carried on the shaft. A tubular shaft 7A is floatingly supported on shaft 7 and provides mounting means for the assembly constituted by the disc-like member of insulation material shown at 11, the electrically insulated collector rings 47 and 48 and the sprocket wheel 26. The circular wound resistance member shown at 12 is carried by the insulated disc-like member 11. A collector ring 14 is insulatingly supported on shaft 7 and is electrically connected to the rotatable brush 15 which electrically engages the circular wound resistance 12. There is a brush 16 which electrically wipes the annular surface of the collector ring 14. Brush 16 is supported by bracket 17 and provides an electrical connection to a controllable impedance circuit and a telephone head-set circuit as shown more clearly in Fig. 8.

The casing 6 of the direction finder unit carries a strip member 18 thereon which is provided with an index reference mark which is related to the calibrated scale 10 and coacts therewith for insuring precision readings. The shaft 7 of the direction finder unit carries sprocket wheel 19 thereon over which chain 20 operates. On the instructor's side of partition 2 we provide a vertically disposed shaft 21 which is journalled by means of brackets 22 extending from partition 2 as shown. A calibrated scale 23 is carried by shaft 21 and a control knob 24 is provided on the end of the shaft 21. A suitable strip 23a mounted on bracket 30 is provided with a reference mark to which the calibrations on scale 23 are related and by which the instructor may observe the procedure adopted by the student. A sprocket wheel 25 is carried by shaft 21 and is engaged by chain 20 so that any movement of the direction finder unit by the student who may operate knob 9 is repeated on the scale 23 so that the instructor may observe the student's procedure in the taking of bearings.

A second sprocket wheel 26 is carried by shaft 7A and is connected by means of chain 27 to the sprocket wheel 28 carried by shaft 29 which is controllable by the instructor. The shaft 29 is journalled in brackets 30 which are supported by partition 2. Shaft 29 carries a control knob 31 thereon and a calibrated scale 32 by which the instructor sets up various direction finder problem for solution by the student. A reference mark 32a is provided on a strip suitably supported on one of the brackets 30 to which various readings on scale 32 are related.

A clutch disc 33 is carried by shaft 29 and has a face 33a thereon which engages the free running disc 34 slidably mounted on the shaft 29 as shown more particularly in Fig. 5. The free running disc 34 has an annular flange 35 thereon and immediately below the annular flange we provide a calibrated scale or compass card 36 as shown. A vertically extending hub 37 is provided on the free running disc 34 and supports a sprocket wheel 38 which is engaged by the chain 39 which extends into the casing 40 mounted on partition 2 and in the student's compartment. The casing 40 contains the ship's compass heading indicator which is at all times visible to the student. Vertically disposed shaft 41 is journalled in casing 40 and carries sprocket wheel 42 over which the chain 39 is engaged. A calibrated scale or compass card 43 similar to the calibrated scale or compass card 36 is carried by shaft 41. An observing aperture 44 is provided in casing 40 through which the calibrated scale or compass card 43 may be read by the student.

A gravity clutch arrangement comprising clutch actuator 45 pivoted at 46 may be manually tripped to raise the free running disc 34 out of engagement from the clutch face 33a of clutch disc 33 and permits flange 35 to be manually gripped for shifting the position of the calibrated scales or compass cards 36 and 43 simultaneously. This permits the compass heading shown by the calibrated scales or compass cards to be changed by the instructor and in the same amount with one operation independently of the rotation of control knob 31 by the instructor. That is to say, the instructor may set up a reading on compass card 43 independently of the control of the instructor of the position of shaft 31 or tubular shaft 7A of the direction finder unit 6. Shaft 7A of the direction finder unit 6 carries separate collector rings 47 and 48 which are electrically connected as illustrated in Fig. 8. The circular continuous resistance 12 is tapped at two opposite points 49 and 50 and a shorting bus 51 connected therebetween and connected to collector ring 47. The resistance 12 is also provided with diametrically opposite taps 52 and 53 which are interconnected by a shorting bus 54 connected to collector ring 48. The shaft 7 of the direction finder unit 6 is rotated by the student to change the effective position of brush 15 on resistance 12 to include various portions of the tapped parts of the resistor 12 in the controlling circuit.

An audio frequency oscillator for generating the signal tone used in the training apparatus of our invention is illustrated at 58 having an audio frequency output transformer 59 whose secondary connects at one end to the brush which coacts with the collector ring 47 carried by shaft 7A. The opposite side of the secondary winding of output transformer 59 is grounded as indicated at 60. Thus a ground return path is established through the telephone head-sets 56 and 57 through ground connections 66 and 67 for the tone frequency supplied from audio frequency oscillator 58 under control of the effective potential across the shunted portions of the continuous resistor 12. A variable rheostat 55 is provided on the instructor's panel 73 electrically connected in series with variable rheostat 55A on the student's radio receiver 72 for permitting the adjustment or regulation of the output of the audio oscillator 58. Control rheostat 55 is adjusted by the instructor to change the signal strength which varies in relation to distance of the transmitting station. In turn control rheostat 55A is regulated by the student to obtain a comfortable working signal in the telephones 57. The variable rheostat 61 is included in circuit with the brush which coacts with collector ring 48 and in circuit with ground as indicated at 62 whereby the broadening effect and loss of the "null" condition received by the direction finder may be reproduced in the instructor's headset 56 and the student's headset 57. When the brush 15 is opposite a grounded tap 52—53 no signal will result, thereby giving the "null" effect of a direction finder bearing in the telephone headsets 56 and 57. Tap 52—53 will only be perfectly grounded when the sliding tap on rheostat 61 which connects to ground 62 is in such a position that it completely shorts out all of the resistance in rheostat 61. Only under the above conditions will a perfect "null" be obtained. As more resistance of rheostat 61 is included in the circuit by moving the sliding tap connecting to ground 62, the "null" consequently broadens, thus reproducing conditions encountered in actual flight when near a transmitting tower. When the brush 15 is moved to either side the audible signal from audio oscillator 58 builds up until past the tapped-in input 49 and 50. Then the signal will diminish to the opposite "null" point. Thus the 180° ambiguity is produced. By reason of the chain and sprocket interconnection the instructor in operating knob 31 turns sprocket wheel 28 and moves chain 27 which correspondingly moves sprocket wheel 26 and sets up the circular resistor 12 for any "relative bearing." The student then operates the rotatable brush 15 by means of knob 9 and finds one or the other of the two "null points" which are readily observable in each of the telephone head-sets 56 and 57. This practice in manipulating the radio direction finder unit 6 in similitude provides valuable training for the student.

In order that both student and instructor may intercommunicate by radio telegraph simulating actual conditions experienced in flight, we provide an auxiliary audio frequency oscillator 63 having one side of the output thereof grounded at 64 and the other side 65 connected to the instructor's head-set 56 and the student's head-set 57 which respectively connect to ground at 66 and 67. The keying circuit for the input of the audio frequency oscillator is indicated at 68 extending to the student's key 69 and the instructor's key 70 by which intercommunication by keying oscillator 63 to produce tones in accordance with the radio telegraphic code in telephone head-sets 56 and 57 may be conducted. In lieu of an auxiliary oscillator 63 we may key a portion of the output of the main audio frequency oscillator 58 and in illustrating an additional audio frequency oscillator we do not intend the system of our invention to be limited thereby.

The radio direction finder receiver has been illustrated schematically at 71. The radio receiver has been illustrated schematically at 72. Both the radio direction finder receiver 71 and the radio receiver 72, while having the outward appearance to the student of the actual equipment installed in aircraft, this apparatus is in fact but a similitude reproduction of the actual equipment. The system of our invention is not to be limited to types such as shown at 71 and 72, for the essential invention which is shown in detail in Fig. 4 may be adapted to any type of old or modern radio receiver or radio direction finding receiver whatsoever. The controls while identical to the controls on the actual apparatus operate remote indicator circuits which are concentrated upon the instructor's panel shown at 73 in the instructor's compartment to enable the instructor to check the procedure and adjustments which are made by the student in any particular direction finder problem. When the proper adjustments are made by the student such as switches-on, dial settings made, correct inductance coils inserted in the units, the instructor will be immediately informed as to the procedure adopted by the student by the energization of indicators on the instructor's panel 73 in the instructor's compartment.

The radio direction finder receiver panel 71 includes coil supports 74 and 75 in which removable inductance units may be placed for the operation of the radio direction finder receiver at proper frequencies. The student is supplied with a multiplicity of inductance coils of various frequencies for the sockets 74 and 75 in the radio direction finder receiver 71 and also for the socket 89 in the radio receiver 72. When the proper coils are selected and inserted in the sockets by the student, the correct choice by the student is indicated to the instructor by the operation of indicator lights on the instructor's panel 73. If the improper coils are selected and inserted in the sockets, other indicators (not shown) are actuated on the panel so that the instructor is informed as to whether the student has made a proper choice of coils for the particular frequencies involved in the problem under determination.

The direction finder receiver panel 71 includes an on and off switch 76 which is connected in the battery power circuit 82 which is employed for operating the indicators on panel 73. The battery power circuit extends through on and off switch 83 on panel 72 of the radio receiver and then to ground 84 by which the circuit is completed to the indicator lights on instructor's panel 73 through ground connection 88. We have indicated the power source as a battery merely for purposes of simplification for actually we provide a power circuit operated from standard 110 volts 60 cycles alternating current to operate the entire system.

The direction finder receiver panel 71 includes a switch 77 simulating the tuning adjustment means on the direction finder receiver and arranged to operate contacts 78 and 79, 80 and 81 when moved to different angular conditions representative of different frequency selections of the tuning adjustment switch 77. The corresponding indicators on the instructor's panel 73 for giving an indication as to the selection of the proper coils in sockets 74 and 75 and the selection of the proper frequency under control of switch 77 are represented at 87, 85 and 86, respectively, on panel 73 connected to ground return path 88. When proper selections have been established by the student, these indicators 87, 85 and 86 will be energized. An improper selection will be immediately indicated by the fact that certain of the indicators are not energized.

The radio receiver panel 72 contains socket 89 for insertion of a removable coil. When the proper selection is made indicator 108 on panel 73 is energized. Panel 72 also contains an adjustable switch 90 which simulates the functioning of the detector control dial. Switch 90 coacts with sets of contacts 91, 92, 93 and 94. When the proper setting of switch 90 is made by the student, indicator 109 is energized on instructor's panel 73.

The radio receiver panel 72 also includes switch 95 which simulates the functioning of the regenerative control dial of the receiver. Switch 95 coacts with sets of contacts 96, 97, 98, 99, 100 and 101 which respectively connect with indicators 102, 103, 104, 105, 106 and 107 on the instructor's panel 73. When a proper selection of regenerative control switch 95 is made by the student the correct indicator on panel 73 is energized which in the particular problem illustrated in Fig. 1 is indicator 102.

The audio frequency oscillator 58 is controllable by the instructor by adjustment of attenuator control knob 110. The auxiliary audio oscillator 63 which provides the keying circuit to the frequency is adjustable under control of the student by means of control knob 111.

Inasmuch as the compass card or scale 36 is carried by disc 34 rotatable freely on shaft 29, the instructor may grasp flange 35 and turn the compass card to that position required by the particular problem involved at the same time that the student's compass card is set in a selected position. Clutch 45 may be actuated to permit change of the compass cards at the will of the instructor. When the clutch is engaged the condition of the ship's changing course is simulated. After the course is presumed to be steadied down, the clutch 45 is thrown out and the relative bearing may be changed without the compass heading's being changed. Arbitrary compass deviation cards are set up and the problems take this into account. Also, arbitrary direction finder calibration curves are used to duplicate actual conditions.

Distance of the receiving station away from the sending station (weak signal for long distance, strong signal for short distance) is produced by the instructor's varying the output of the audio oscillator. The student compensates for this changing strength of signal by varying the volume control 55A on his receiver 72.

For the effect of overheads (passing directly over the station, where no "null" is possible) the rheostat at 61 is thrown in at full value, voiding the two "null" points. The instructor's distance-control or power output is varied at the same time according to normal reception values.

To duplicate actual operation of radio sets, actual receiver cabinets 71 and 72 are used. They are dummy receivers so rewired so that when the proper adjustments (such as switches on, dial settings made, correct coils in units) are made, these operations are made apparent to the instructor. For any given station that a bearing is required from, certain adjustments must be made. When each individual adjustment is properly made, one of several lights in a row on instructor's control cabinet lights up. When all the lights in the row for a given station light up, the instructor then gives the proper distance signal and proper relative bearing. If any one of the lights is not lighted, then the instructor gives no signal. Thus, practice is obtained in operating properly any type of radio equipment desired.

The dummy direction finder receiver controls may complete the signal circuit only if all the proper adjustments are made, rather than indicate proper adjustment by telltale lights. Our invention is applicable to various types of receivers useful for training purposes.

The telegraph keys 69 and 70 provided for the student and the instructor control signals in head-sets 56 and 57 so that conditions of calling for QTG's (signal for bearing observation) etc., may be duplicated.

Regular problems on maps of given areas are set up. Thus by notations on the problem map the instructor knows by clock time what distance signal, what compass heading and what relative bearing should be set up for any given station on the chart.

Problems may be set up in the following order:
1. Cross fixes from two or more stations for an airplane progressing along a straight line.
2. Fixes abeam while passing a single station.
3. Flying past and close abeam to a station and obtaining time passed abeam. (Practice in following rapidly changing bearings).
4. Boxing problems.
5. Orientation (determining true or reciprocal bearing).
6. Homing and overhead problems.
7. Let-down problems.

To facilitate the instructor's setting of the relative bearing values and other pertinent data, the apparatus shown in Fig. 7 may be employed. On a map of the area in which the problem is located there is permanently set up a channel track 112 over the exact proposed path of the aircraft. In this channel track 112 there is a follower 114 (the center of which is considered to be the aircraft) that is pulled along at the rate of speed of the aircraft reduced in the same proportion as the scale of the map is reduced. This may be accomplished by a geared motor 115 running a windlass 116 that draws the string 117 attached to the follower 114.

On the follower 114 there is rigidly fixed a compass rose scale 118 that has the zero point, pointing in the direction of the follower's movement. That is, zero forward, 90 degrees to the right, 180 degrees astern and 270 degrees to the left. A pin 119 extends up from the center of the compass rose scale 118.

At each radio beacon station (the station transmitting the signal) such as indicated at 120, there is a true compass rose 121 set over the center location of the station. A string 122 with its looped end is loosely hooked over the pin 119 on the follower 114. The string 122 is pulled tightly across the map and goes through a grommet 123 in the center of the compass rose 121 and through the surface of the table indicated at 124. A small weight indicated at 125 is attached to the end of string 122 to keep the string taut but still allows free movement of the follower 114. The follower 114 may be any sort of moving indicator that assumes the positions of an aircraft in flight.

Now as the follower 114 progresses along its path 112, the relative bearing of the station is apparent under the string 122 on the compass rose 118 of the follower 114. The true bearing of the aircraft from the station is indicated by the position under the string on the station's compass rose 121.

Other pertinent data is placed on the map beside the channel groove 112 and used as the follower reaches the adjacent data. This system gives a natural timed progression of events as experienced in actual flight.

In Fig. 7 we have shown two positions of the follow-up as it advances along the channel section 112. The arrangement of parts is similar but in the second position we have indicated similar parts by the same reference characters followed by a prime mark.

This enables the instructor to set up actual problems with respect to position of stations to be located in similitude by the student and gives the instructor specific data upon which to check the student's solution of the problem.

A typical problem showing the let-down procedure to be followed using the direction finder is represented in Fig. 6. The student should be able to plot the track of the plane, for example, from minute 1 to minute 5. From there the student should be able to determine when the plane passes over the station or on which side of the station the plane passes and approximately how far away the plane is from the station. The student should be able to plot the approximate track of the plane from the balance of the information he secures from the one station.

In Fig. 6 we have indicated plane 126 approaching the landing field 127 using the direction finder to obtain course bearings on two stations indicated at 128 and 129 which I have hereinafter referred to as stations A and B, respectively. The student should be able to effect an approach for a landing of the plane 126 on the landing field 127 using readings from station A alone. The following factors are given to the student by the instructor:

Magnetic variation 11° West.
Wind 15 miles per hour from 340°.
True airspeed 120 miles per hour.
Scale 1″=2 miles.
Direction finder loop considered to be pre-calibrated and requires no calibration correction.

The student and instructor synchronize their clocks. The student takes bearings on either station for first five minutes and then only on station A. The instructor sets the relative bearing of the station tuned in by the student for corresponding time and also sets the magnetic heading according to time and the volume control according to time while volume 10 is considered to be full and volume 0 is considered to be off.

The following readings should be developed by the student in order that the student may effect a successful let-down procedure:

| Time in minutes | Relative bearing, station B | Relative bearing, station A | Magnetic heading | Volume control | Instructions: Student and instructor synchronize their clocks |
|---|---|---|---|---|---|
| 1. | 282 | 335 | 52° | 4 | Student takes bearings on either station for first 5 minutes, then only on station A. |
| 1.5 | 275 | 333 | 52° | | |
| 2. | 269 | 330 | 52° | | |
| 2.5 | 262 | 326 | 52° | 5 | Instructor sets relative bearing of station tuned in by student for corresponding time. |
| 3. | 256 | 322 | 52° | | |
| 3.5 | 250 | 317 | 52° | | Also sets mag. heading according to time. |
| 4. | 245 | 312 | 52° | 6 | Also sets volume control according to time. Volume 10=full 0=off. |
| .5 | 240 | 305 | 52° | | |
| 5. | 236 | 297 | 52° | 7 | |
| | | | | | 5.3 min. lock clutch-start turn. |
| | | | | | 5.9 min. unlock clutch-stop turn. |
| .5 | 257 | 313 | 343 | | |
| 6. | | 357 | 343 | | |
| .5 | | | 343 | 8 | |
| 7. | | 356 | 343 | | |
| .5 | | | 343 | 9 | |
| 8. | | 354 | 343 | | |
| .5 | | 347 | 343 | | |
| | | | | | 9.1 minutes abeam. |
| 9. | | 307 | 335 | 10 | |
| .5 | | 198 | 335 | | |
| 10. | | 182 | 341 | 9 | |
| .5 | | | 341 | | |
| 11. | | 182 | 341 | 8 | |
| .5 | | 182 | 341 | | |
| | | | | | 11.5 min. lock clutch-start turn. |
| | | | | | 12.5 min. unlock clutch-stop turn. |
| 12. | | 147 | (¹) | 7 | |
| .5 | | 77 | 93 | | |
| 13. | | 89 | 93 | 7 | |
| .5 | | 100 | 93 | | |
| | | | | | 13.5 min. lock clutch-start turn. |
| | | | | | 14.5 min. unlock clutch-stop turn. |
| 14. | | 50 | (¹) | 7 | |
| .5 | | 358 | 211 | | |
| 15. | | 359 | 211 | 8 | |
| .5 | | 360 | 211 | 9 | |
| 16. | | 15 | 211 | 10 | |
| | | | | | 16.2 minutes abeam. |
| .5 | | 164 | 219 | | |
| 17. | | 178 | 213 | 9 | |
| .5 | | 178 | 213 | | |
| 18. | | 178 | 213 | 8 | |

¹ Turning.

By reason of the mechanical and electrical coaction of the instructor and student apparatus both electrically and mechanically, a close check of the student's procedure may be followed at all times by the instructor who is provided with adequate facilities for obtaining accurate data for the proper let-down procedure according to the equipment of Fig. 7 to which the instructor refers from time to time in checking readings which should be determined and set up and reproduced by the student.

We may apply our invention in various ways. For example, we may utilize a track in a boxing problem marked out around transmitter tower with radial lines drawn from the tower indicating relative bearing from the plane of the tower for every 5° of change. At the intersection of each radial with the track line is marked the progressive time elapsed for any given ground speed and by watching a stop watch with seconds on it, it is fairly easy to rotate knob 31 at the proper rate of change.

In illustrating our invention we have shown only a small number of indicating devices in the instructor's compartment which are functioned by certain control devices in the student's compartment. It will be understood that our disclosure is merely representative of a large number of indicating devices which are provided in the instructor's compartment for indicating the various procedural steps which are taken by the student in the solution of various direction finder problems. That is to say, additional indicators will be provided in the instructor's compartment for circuits extending from various contacts of the control devices in the student's compartment.

We have found the equipment of our invention highly practical in its construction and operation. The apparatus is simple and efficient and provides means for rapid training of personnel in substantial numbers. We realize that modifications may be made in the arrangement of the apparatus and we intend no limitations upon our invention other than may be imposed by the scope of the appended claims.

What we claim as new and desire to secure by Letters Patent of the United States is as follows:

1. Apparatus for instructing and training personnel in the operation of radio direction finder apparatus including an instructor's compartment and a student's compartment, apparatus in the instructor's compartment interconnected with apparatus in the student's compartment for setting up various radio direction finder problems in the student's compartment initiated from the instructor's compartment, means in said instructor's compartment for indicating various procedural steps normally performed in direction finding, and means in said student's compartment for effecting the operation of the indicating apparatus in the instructor's compartment for indicating the procedural steps taken by the student in the student's compartment.

2. Apparatus for instructing personnel in the operation of radio direction finder apparatus comprising in combination an instructor's compartment and a student's compartment, apparatus in said student's compartment simulating radio direction finder receiving equipment having a multiplicity of adjustable controls, indicator apparatus in said instructor's compartment actuated by the adjustable controls in said student's compartment for indicating the correctness or incorrectness of adjustments effected in said student's compartment, a radio direction finder controller in said student's compartment, a repeater in said instructor's compartment actuated by said radio direction finder controller, a setting device in said instructor's compartment, means interconnecting said setting device with said radio direction finder controller, a repeater located in said student's compartment and operated by said setting device in said instructor's compartment, and means associated with said setting device for disabling the direct control between said setting device and said last mentioned repeater for permitting independent setting of said last mentioned repeater.

3. Apparatus for instructing personnel in the operation of radio direction finder apparatus comprising in combination an instructor's compartment, a student's compartment, a calibrated setting device in said instructor's compartment, a radio direction finder controller in said student's compartment, means interconnecting said setting device with said radio direction finder controller for setting said controller to a predetermined position, a repeater in said student's compartment, means controlled by said setting device for operating said repeater, and a separate repeater in said instructor's compartment controlled by said radio direction finder controller for indicating all of the movements of said radio direction finder controller.

4. Apparatus for instructing personnel in the operation of radio direction finder apparatus comprising in combination an instructor's compartment, a student's compartment, a calibrated setting device in said instructor's compartment, a radio direction finder controller in said student's compartment, means interconnecting said setting device with said radio direction finder controller for setting said controller to a predetermined position, a repeater in said student's compartment, means controlled by said setting device for operating said repeater, a separate repeater in said instructor's compartment controlled by said radio direction finder controller for indicating all of the movements of said radio direction finder controller, and means for adjusting the position of said first mentioned repeater from said instructor's compartment independently of the operation of said setting device.

5. Apparatus for instructing personnel in the operation of radio direction finder apparatus comprising in combination an instructor's compartment, a student's compartment, a calibrated setting device in said instructor's compartment, a radio direction finder controller in said student's compartment, means interconnecting said setting device with said radio direction finder controller for setting said controller to a predetermined position, a compass scale rotatably mounted in said student's compartment, a master compass scale associated with said setting device, means associated with said setting device for adjusting the compass scale in said student's compartment either simultaneously with or independently of the movement of said setting device, and a repeater in said instructor's compartment driven from said radio direction finder controller in said student's compartment for indicating in said instructor's compartment all adjustments made in said student's compartment.

6. In an apparatus for instruction and training of personnel in the operation of radio direction finder apparatus, an angularly shiftable setting device, a radio direction finder controller, means interconnecting said device and said controller for adjusting said controller to selected positions according to the movement of said device, a repeat motion device, means for driving said repeat motion device according to the movement of said setting device, a second repeat motion device, and means for driving said second repeat motion device from said radio direction finder controller.

7. In an apparatus for instruction and training of personnel in the operation of radio direction finder apparatus, an angularly shiftable setting device, a radio direction finder controller, means interconnecting said device and said controller for adjusting said controller to selected positions according to the movement of said device, a calibrated repeat motion device, means for driving said calibrated repeat motion device according to the movement of said setting device, a second calibrated repeat motion device, and means for driving said second calibrated repeat motion device from said radio direction finder controller.

8. In an apparatus for instruction and training of personnel in the operation of radio direction finder apparatus, an angularly shiftable setting device, a radio direction finder controller, means interconnecting said device and said controller for adjusting said controller to selected positions according to the movement of said device, a repeat motion device, means for driving said repeat motion device according to the movement of said setting device, a second repeat motion device, means for driving said second repeat motion device from said radio direction finder controller, means operated by said radio direction finder controller for simulating the null conditions of reception in radio direction finders, a telephone circuit, and a source of energy for said telephone circuit, said last mentioned means operating to variably control the effect of said source of energy upon said telephone circuit according to the adjustment of said radio direction finder controller.

9. In an apparatus for instruction and training of personnel in the operation of radio direction finder apparatus, an angularly shiftable setting device, a radio direction finder controller, means interconnecting said device and said controller for adjusting said controller to selected positions according to the movement of said device, a repeat motion device, means for driving said repeat motion device according to the movement of said setting device, a second repeat motion device, means for driving said second repeat motion device from said radio direction finder controller, an electrical resistor variable in position in accordance with the movement of said radio direction finder controller, a telephone circuit, a source of energy for said telephone circuit, connections including said resistor, said telephone circuit and said source of energy, the angular displacement of said resistor operating to vary the effect of said source upon said telephone circuit for simulating the effect of null conditions upon the radio direction finder apparatus as the radio direction finder controller is adjusted.

10. In an apparatus for instruction and training of personnel in the operation of radio direction direction finder apparatus, an angularly shiftable setting device, a radio direction finder controller, means interconnecting said device and said controller for adjusting said controller to selected positions according to the movement of said device, a repeat motion device, means for driving said repeat motion device according to the movement of said setting device, a second repeat motion device, means for driving said second repeat motion device for said radio direction finder controller, means operated by said radio direction finder controller for simulating the null conditions of reception in radio direction finders, a telephone circuit, a source of energy for said telephone circuit, said last mentioned means operating to variably control the effect of said source of energy upon said telephone circuit according to the adjustment of said radio direction finder controller, and separate means for controlling the amplitude of the energy transferred from said source to said telephone circuit.

11. In an apparatus for instruction and training of personnel in the operation of radio direction finder apparatus, an angularly shiftable setting device, a radio direction finder controller, means interconnecting said device and said controller for adjusting said controller to selected positions according to the movement of said device, a repeat motion device, means for driving said repeat motion device according to the movement of said setting device, a second repeat motion device, means for driving said second repeat motion device from said radio direction finder controller, means operated by said radio direction finder controller for simulating the null conditions of reception in radio direction finders, and additional means responsive to said null simulating means for indicating said null conditions.

12. In an apparatus for instruction and training of personnel in the operation of radio direction finder apparatus, an angularly shiftable setting device, a radio direction finder controller, means interconnecting said device and said controller for adjusting said controller to selected positions according to the movement of said device, a repeat motion device, means for driving said repeat motion device according to the movement of said setting device, a second repeat motion device, means for driving said second repeat motion device from said radio direction finder controller, means operated by said radio direction finder controller for simulating the null conditions of reception in radio direction finders, an audio oscillator circuit, a telephone receiver associated therewith, and a source of electrical energy for the oscillator circuit, said last mentioned means operating to variably control the effect of said source of electrical energy upon the oscillator circuit according to the adjustment of said radio direction finder controller.

HOWARD M. CONE, Jr.
RAYMOND R. BOURRET.
LOUIS E. MICHELFELDER.